US011171500B2

(12) United States Patent
Yen

(10) Patent No.: US 11,171,500 B2
(45) Date of Patent: Nov. 9, 2021

(54) SMART BATTERY DEVICE AND CHARGING METHOD

(71) Applicant: Quanta Computer Inc., Taoyuan (TW)

(72) Inventor: Wei-Ting Yen, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 189 days.

(21) Appl. No.: 16/573,452

(22) Filed: Sep. 17, 2019

(65) Prior Publication Data
US 2020/0403416 A1 Dec. 24, 2020

(30) Foreign Application Priority Data
Jun. 20, 2019 (TW) ................. 108121405

(51) Int. Cl.
*H02J 7/00* (2006.01)
*H01M 10/615* (2014.01)
*H01M 10/44* (2006.01)
*H01M 10/48* (2006.01)

(52) U.S. Cl.
CPC ............ *H02J 7/007* (2013.01); *H01M 10/443* (2013.01); *H01M 10/486* (2013.01); *H01M 10/615* (2015.04)

(58) Field of Classification Search
CPC .... H02J 7/007; H02J 7/00306; H02J 7/00309; H02J 7/005; H02J 7/0031; H02J 7/0048; H02J 7/00714; H02J 7/007194; H01M 10/615; H01M 10/443; H01M 10/486; Y02T 90/12; Y02T 10/7072; Y02T 10/70; Y02E 60/10; B60L 58/27; B60L 58/12; B60L 2240/545; B60L 58/25; B60L 53/62
See application file for complete search history.

(56) References Cited

U.S. PATENT DOCUMENTS

| 9,386,213 | B2 | 7/2016 | Matsumoto |
| 10,358,047 | B2 | 7/2019 | Murata et al. |
| 2009/0167253 | A1 | 7/2009 | Muraoka et al. |

(Continued)

FOREIGN PATENT DOCUMENTS

| CN | 101461118 A | 6/2009 |
| CN | 206086422 U | 4/2017 |

(Continued)

OTHER PUBLICATIONS

Japanese language office action dated Jan. 12, 2021, issued in application No. JP 2020-003781.

(Continued)

*Primary Examiner* — Nha T Nguyen
(74) *Attorney, Agent, or Firm* — McClure, Qualey & Rodack, LLP

(57) ABSTRACT

The present invention provides a smart battery device and a charging method. The charging method includes: obtaining a battery temperature of a battery unit; determining whether the battery temperature is lower than a first preset temperature; determining whether a current capacity of the battery unit is lower than a preset capacity when the battery temperature is lower than the first preset temperature; and enabling a heating system to increase the battery temperature when the current capacity of the battery unit is lower than the preset capacity.

8 Claims, 2 Drawing Sheets

(56) References Cited

U.S. PATENT DOCUMENTS

| | | | |
|---|---|---|---|
| 2015/0144614 A1* | 5/2015 | Kim | H01M 10/6571 219/494 |
| 2016/0149275 A1* | 5/2016 | Minamiura | H02J 7/0071 320/107 |
| 2017/0057376 A1* | 3/2017 | Murata | B60L 58/27 |
| 2017/0098874 A1* | 4/2017 | Shen | H01M 10/486 |
| 2017/0120775 A1* | 5/2017 | Murata | B60W 10/26 |
| 2017/0170673 A1* | 6/2017 | Zhang | H01M 10/443 |
| 2018/0072183 A1* | 3/2018 | Nomura | H01M 10/625 |
| 2018/0159469 A1 | 6/2018 | Trupke et al. | |
| 2018/0170208 A1* | 6/2018 | Park | H01M 10/625 |
| 2019/0305393 A1* | 10/2019 | Oguma | B60L 58/13 |
| 2019/0348724 A1* | 11/2019 | Satoh | B60L 1/02 |
| 2019/0359082 A1* | 11/2019 | Hou | H01M 10/6571 |
| 2019/0363550 A1* | 11/2019 | Zu | H02J 7/0029 |
| 2019/0386352 A1* | 12/2019 | Kim | H01M 50/20 |
| 2019/0393568 A1* | 12/2019 | Lewis | H01M 10/63 |
| 2020/0127342 A1* | 4/2020 | Grimaud | H01M 10/633 |
| 2020/0274209 A1* | 8/2020 | Takazawa | H01M 10/425 |
| 2020/0313255 A1* | 10/2020 | Wu | B60H 1/323 |
| 2020/0321668 A1* | 10/2020 | Xiong | H01M 10/486 |
| 2020/0381935 A1* | 12/2020 | Shimada | B60L 7/10 |
| 2021/0028509 A1* | 1/2021 | Su | H01M 10/625 |
| 2021/0036388 A1* | 2/2021 | Liu | H01M 10/633 |
| 2021/0066771 A1* | 3/2021 | Shimura | H01M 10/6571 |
| 2021/0075073 A1* | 3/2021 | Hou | H01M 10/657 |

FOREIGN PATENT DOCUMENTS

| | | |
|---|---|---|
| CN | 206416873 U | 8/2017 |
| JP | H11-150885 A | 6/1999 |
| JP | 2009-254097 A | 10/2009 |
| JP | 2014-110715 A | 6/2014 |
| JP | 2014-119715 A | 6/2014 |
| JP | 2015-156765 A | 8/2015 |
| JP | 2015-225782 A | 12/2015 |
| JP | 2017-132398 A | 8/2017 |
| JP | 2018-026300 A | 2/2018 |
| TW | 201834382 A | 9/2018 |
| TW | 201924134 A | 6/2019 |
| WO | 2013/174271 A1 | 11/2013 |
| WO | 2017/056162 A1 | 4/2017 |

OTHER PUBLICATIONS

English language translation of Japanese office action.
Extended European Search Report dated Apr. 23, 2020, in European application No. 19197881.6.
Korean language office action dated Nov. 17, 2020, issued in application No. KR 10-2019-0120013.
Chinese language office action dated Oct. 1, 2019, issued in application No. TW 108121405.
Korean Language Office Action dated May 10, 2021 for its corresponding KR application No. 10-2019-0120013.

* cited by examiner

SMART BATTERY DEVICE AND CHARGING METHOD

CROSS REFERENCE TO RELATED APPLICATIONS

This application claims priority of Taiwan Patent Application No. 108121405, filed on Jun. 20, 2019, the entirety of which is incorporated by reference herein.

BACKGROUND OF THE INVENTION

Field of the Invention

The present invention relates to charging technology, and more particularly to a battery device and a charging method.

Description of the Related Art

Battery devices can provide electrical energy. Therefore, battery devices are commonly found in various electronic devices. In recent years, with the evolution of technology and the rising awareness of the need to conserve energy and reduce carbon dioxide emissions, manufacturers have even begun applying battery devices to electric vehicles (for example, electric cars and electric scooters). The application of battery devices as driving sources for the electric vehicles can reduce exhaust emissions and help solve problems like air pollution, resulting in a yearly increase in the use of electric vehicles.

In general, each battery device has its own proper operating temperature range. Extremely high temperatures and extremely low temperatures are all detrimental to the operation of a battery device. In particular, when a battery device is in a low-temperature environment, the capacity of the battery device will be low. Moreover, sometimes a battery device cannot even be charged with electricity, especially when the battery device is in a low-temperature environment. Furthermore, if the battery device is in a low-temperature environment and under a heavy load, the endurance of the battery device will be reduced further.

BRIEF SUMMARY OF THE INVENTION

In an embodiment, a battery device comprises a battery unit, a temperature sensing unit, a heating system, and a processing unit. The temperature sensing unit is configured to sense a battery temperature of the battery unit. The heating system is configured to heat the battery unit. The processing unit is configured to charge the battery unit with a charging current, obtain the battery temperature using the temperature sensing unit, and determine whether the battery temperature is lower than a first preset temperature. When the processing unit determines that the battery temperature is lower than the first preset temperature, the processing unit determines whether a current capacity of the battery unit is lower than a preset capacity. Moreover, when the processing unit determines the current capacity of the battery unit is lower than the preset capacity, the processing unit enables the heating system to raise the battery temperature.

In an embodiment, a charging method comprises: charging a battery unit with a charging current; obtaining a battery temperature of the battery unit; determining whether the battery temperature is lower than a first preset temperature; determining whether a current capacity of the battery unit is lower than a preset capacity when the battery temperature is lower than the first preset temperature; and enabling a heating system to raise the battery temperature when the current capacity of the battery unit is lower than the preset capacity.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In order to make the above objects, features and advantages of the embodiments of the present invention easier to understand, a detailed description is given in the following embodiments with reference to the accompanying drawings.

It should be understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", etc., to modify an element does not by itself connote any priority or precedence, but are used merely as labels to distinguish the elements that have the same name.

Figure 1:
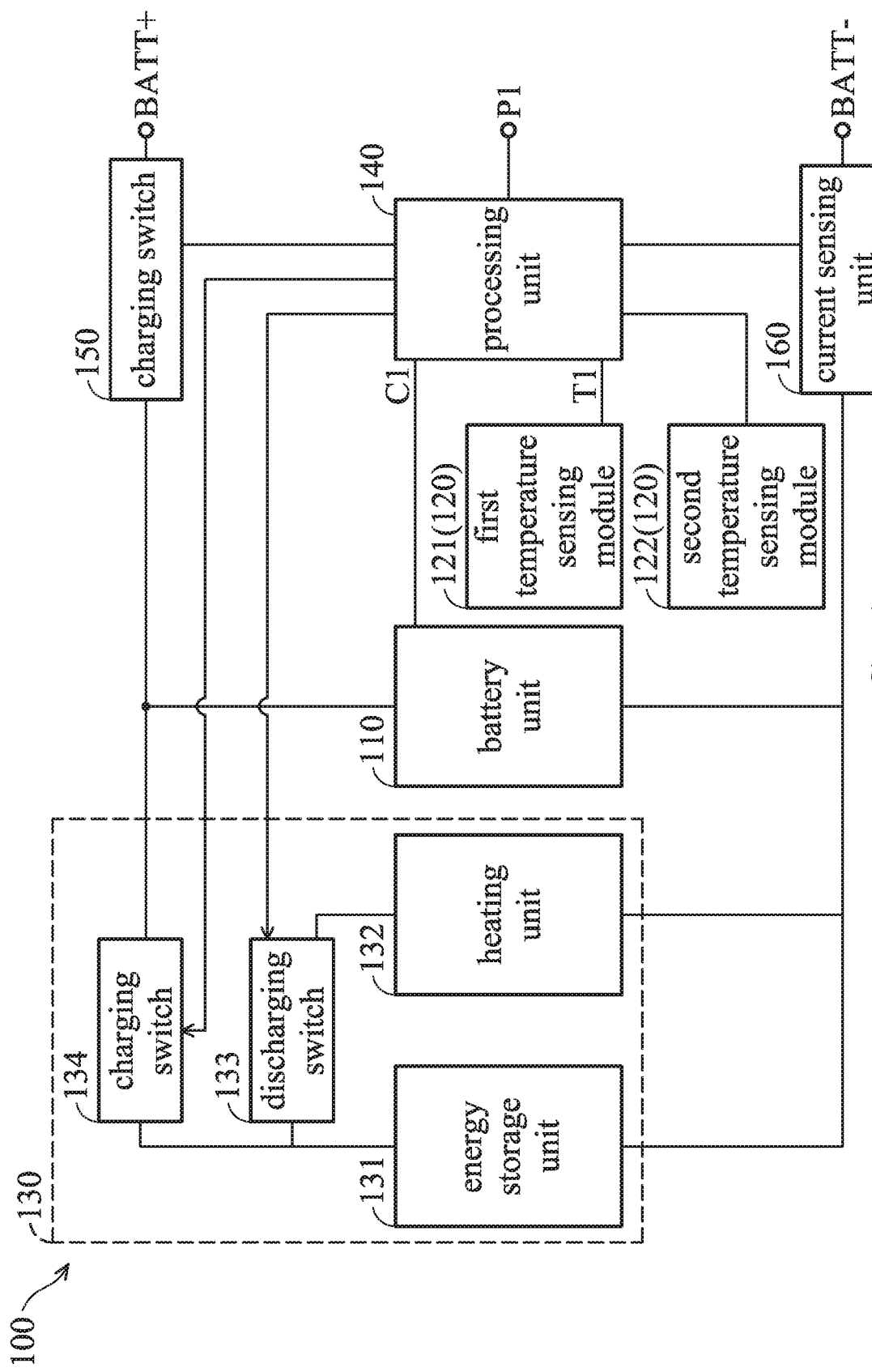
FIG. 1 is a schematic diagram illustrating an embodiment of battery device.

FIG. 1 is a schematic diagram illustrating an embodiment of battery device. Please refer to FIG. 1, battery device 100 is configured to store electrical power and can provide the stored electrical power to a power receiving device (not shown). In some embodiments, the power receiving device can be various electrical devices that need to be actuated with the electrical power. Herein, the power receiving device can be electric vehicle in particular, and the battery device 100 is a battery that can be installed in the electric vehicle.

The battery device 100 includes a battery unit 110, a temperature sensing unit 120, a heating system 130 and a processing unit 140. Wherein, the processing unit 140 couples to battery unit 110, the temperature sensing unit 120 and the heating system 130.

The battery unit 110 is configured to provide electrical power. In some embodiments, the battery unit 110 can be formed by one or more battery cells in series and/or in parallel. In some implementations, the battery unit 110 can be a Lithium battery, a Nickel-Hydrogen battery, a Sealed Lead-Acid battery, or any other suitable rechargeable battery.

The temperature sensing unit 120 is configured to sense a battery temperature T1 of the battery unit 110, and can report the battery temperature T1 to the processing unit 140. In some embodiments, the temperature sensing unit 120 can be embedded in a case of the battery unit 110, and the battery temperature T1 sensed by the temperature sensing unit 120 is the internal temperature of the battery unit 110.

In other embodiments, the temperature sensing unit 120 can also be disposed out of and adjacent to the case of the battery unit 110, and the battery temperature T1 sensed by the temperature sensing unit 120 is the ambient temperature.

However, the present invention is not limited thereto. In still other embodiments, the temperature sensing unit 120 can further include a first temperature sensing module 121 and a second temperature sensing module 122. The first temperature sensing module 121 is embedded in the case of the battery unit 110 for sensing the internal temperature of the battery unit 110. The second temperature sensing module 122 is disposed out of and adjacent to the case of the battery unit 110 for sensing the ambient temperature outside the battery unit 110.

In some implementations, the temperature sensing unit 120 can be realized by PTC (positive temperature coefficient) thermistor, NTC (negative temperature coefficient) thermistor, temperature sensing chip or any other suitable temperature sensing elements.

The heating system 130 is disposed adjacent to the battery unit 110, and the heating system 130 can heat the battery unit 110 when it is required to raise the battery temperature T1 of the battery unit 110.

The processing unit 140 can perform the charging method of any embodiments of the present invention when detecting a charging signal, so as to charge the battery unit 110. In some embodiments, the charging signal could be a charging current I1. For example, the processing unit 140 can start performing the charging method of any embodiments of the present invention when detecting that the charging current I1 is input through a battery positive terminal BATT+ of the battery device 100. However, the present invention is not limited thereto. In other embodiments, the charging signal could be a handshake request signal sent from a power supply (not shown), and the processing unit 140 can start performing the charging method of any embodiments of the present invention after replying to this handshake request signal via a signal transmission terminal P1 which is coupled to the power supply. Wherein, the power supply could output charging current I1 to battery positive terminal BATT+ of the battery device 100 after receiving the reply.

In some implementations, the processing unit 140 can be realized by SoC (System on Chip), CPU (Central Processing Unit), MCU (Microcontroller), ASIC (Application Specific Integrated Circuit), AP (Application Processor), DSP (Digital Signal Processor) or the like. Furthermore, the power supply can be a charging pile.

Figure 2:
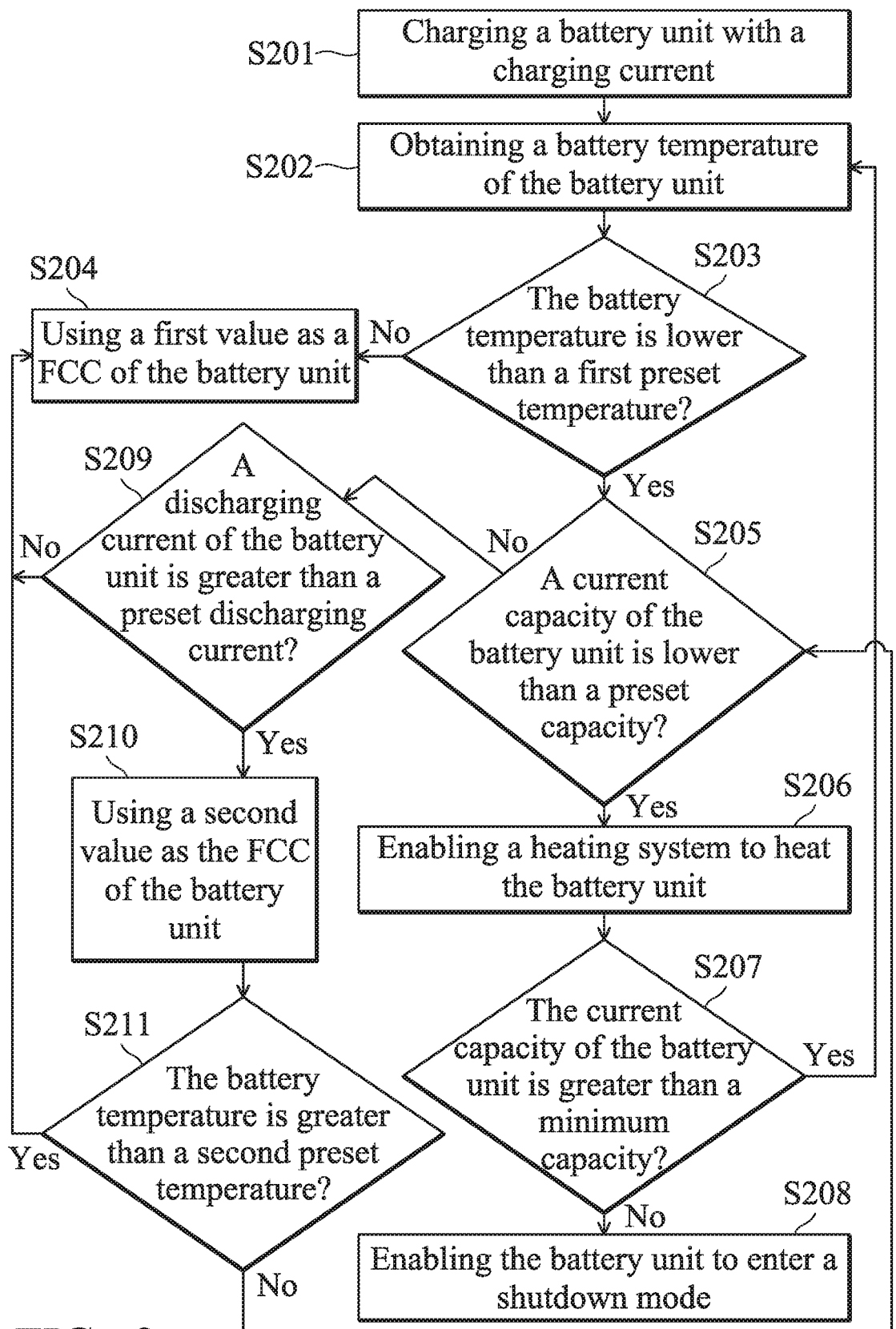
FIG. 2 is a flowchart illustrating an embodiment of charging method.

FIG. 2 is a flowchart illustrating an embodiment of charging method. Please refer to FIG. 1 and FIG. 2. In an embodiment of the charging method, the processing unit 140 of the battery device 100 can charge the battery unit 110 by using the charging current I1 (step S201), and obtain a battery temperature T1 of the battery unit 110 through the temperature sensing unit 120 (step S202). Wherein, the temperature sensing unit 120 can be the first temperature sensing module 121 embedded in the case of the battery unit 110, or the second temperature sensing module 122 disposed out of and adjacent to the case of the battery unit 110.

In an embodiment of step S201, the battery device 100 can further include a charging switch 150, and the charging switch 150 is coupled between the battery positive terminal BATT+ and a positive terminal of the battery unit 110. Herein, the processing unit 140 can establish an electrical connection path between the battery positive terminal BATT+ and a positive terminal of the battery unit 110 by turning on the charging switch 150, so that the charging current could flow to the positive terminal of the battery unit 110 via the battery positive terminal BATT+ to charge the battery unit 110. In some implementations, the charging switch 150 can be realized by but not limited to FET (Field-Effect Transistor).

In some embodiments, a charging temperature of the battery unit 110 could be substantially range from 0 degrees Celsius to 60 degrees Celsius. Since the battery temperature T1 would affect the charging and discharging performance of the battery unit 110, the processing unit 140 can perform step S202 to obtain the battery temperature T1 at first, and then request, according to the battery temperature T1, the power supply to supply the charging current I1 which has corresponding C-rate to charge the battery device 100. However, the present invention is not limited thereto. The processing unit 140 can also charge the battery unit 110 by the charging current I1 which has predetermined C-rate output by the power supply at first, and then request, according to the battery temperature T1 obtained in step S202, the power supply to supply the charging current I1 which has corresponding C-rate.

For example, since short circuit phenomenon is prone to occur in the condition that the battery unit 110 is charged with a charging current I1 which has a high C-rate (e.g., 1 C) under low temperatures (e.g., the battery temperature T1 is between 0 degrees Celsius and 5 degrees Celsius), the processing unit 140 can request the power supply to provide a charging current I1 which has a low C-rate, for example, a charging current I1 with 0.5 C. If the battery temperature T1 is between 5 degrees Celsius and 10 degrees Celsius, the processing unit 140 can request the power supply to provide a charging current I1 with 0.7 C. If the battery temperature T1 is between 10 degrees Celsius and 45 degrees Celsius, the processing unit 140 can request the power supply to provide a charging current I1 with 1 C. Moreover, if the battery temperature T1 is between 45 degrees Celsius and 60 degrees Celsius, the processing unit 140 can request the power supply to provide a charging current I1 with 0.7 C since the lifetime of the battery unit 110 is prone to shorten under certain conditions, such as when the battery unit 110 is being charged with a charging current I1 that has a high C-rate at high temperatures.

In an embodiment of the charging method, after obtaining the battery temperature T1, the processing unit 140 can compare the battery temperature T1 with a first preset temperature to determine whether the battery temperature T1 is lower than the first preset temperature (step S203). Herein, the first preset temperature could be a temperature threshold at which the battery unit 110 can operate normally. In some implementations, the first preset temperature can substantially range from 5 degrees Celsius to 10 degrees Celsius. For example, the processing unit 140 can use 5 degrees Celsius as the first preset temperature.

When the processing unit 140 determines that the battery temperature T1 is greater than or equal to the first preset temperature, it indicates that the battery unit 110 may be able to operate normally, and the processing unit 140 can set a first value as the full charge capacity (FCC) (step S204). In some implementations, the first value may be a preset full charge capacity of the battery unit 110. When the first value is represented in a relative state-of-charge (RSOC), the first value may be, for example, 100%.

In some embodiments, after performing step S204, the processing unit 140 could further return to step S202 to continuously track the battery temperature T1.

When the processing unit 140 determines that the battery temperature T1 is lower than the first preset temperature, it indicates that the battery unit 110 is in a low-temperature state, the processing unit 140 can further determine whether a current capacity C1 of the battery unit 110 is lower than a preset capacity (step S205), so as to decide whether the battery unit 110 still has sufficient power, and the processing unit 140 can perform the subsequent steps according to the determination result of step S205.

In an embodiment of step S205, the processing unit 140 may calculate the current capacity C1 of the battery unit 110 by an OCV (Open Circuit Voltage) method, a coulomb measurement method, or the like. In some implementations, when the preset capacity is represented in a relative state-of-charge, the preset capacity may be, for example, 30%.

When the determination result in step S205 is that the current capacity C1 of the battery unit 110 is lower than the preset capacity, it indicates that the battery unit 110 is in a low-temperature state and does not have much power, and therefore the processing unit 140 can enable the heating system 130 to heat the battery unit 110 (step S206), so as to improve the charging performance of the battery unit 110 by raising the battery temperature T1 of the battery unit 110. For example, after the battery temperature T1 of the battery unit 110 rises, the capacity of the battery unit 110 can also be raised and it can be charged to a higher power level. In another example, after the battery temperature T1 of the battery unit 110 rises, the processing unit 140 could request the power supply to provide a charging current I1 which has a higher C-rate to shorten charging time.

In an embodiment of step S206, the heating system 130 can include an energy storage unit 131, a heating unit 132 and a discharging switch 133. The energy storage unit 131 is coupled to the heating unit 132 in parallel, and the discharging switch 133 is coupled between the energy storage unit 131 and the heating unit 132. The energy storage unit 131 is configured to store energy. The heating unit 132 is disposed adjacent to the battery unit 110, and the heating unit 132 is configured to heat the battery unit 110.

Herein, the processing unit 140 can enable the heating system 130 by turning on the discharging switch 133. The discharging switch 133 is controlled by the processing unit 140. The discharging switch 133 can establish (conduct) an electrical connection between the energy storage unit 131 and the heating unit 132 after being turned on, and the energy storage unit 131 can thereby provide energy to the heating unit 132 via the discharging switch 133, so that the heating unit 132 may generate thermal energy to increase the battery temperature T1 of the battery unit 110 according to the energy provided by the energy storage unit 131.

In another embodiment of step S206, in addition to enabling the heating system 130 to increase the battery temperature T1 of the battery unit 110, the processing unit 140 can further output a down-performance signal to the power receiving device, such that the power receiving device could improve the endurance of the battery unit 110 by reducing its operating efficiency. For example, when the power receiving device coupled to the battery device 100 is an electric car, the electric car may start to limit its maximum driving speed at the time it receives the down-performance signal sent by the processing unit 140, e.g., from 200 kilometers per hour (Km/h) to 160 kilometers per hour.

In some embodiments, the heating system 130 can further include a charging switch 134. The charging switch 134 is coupled between the charging switch 150 and the energy storage unit 131. The charging switch 134 is controlled by the processing unit 140, and the processing unit 140 could supplement the energy of the energy storage unit 131 by turning on the charging switch 134. Herein, when the processing unit 140 turns on the charging switch 134, the charging switch 134 establishes an electrical connection between the charging switch 150 and the energy storage unit 131, whereby the charging current I1 input through the charging switch 150 could also charge the energy storage unit 131 through the charging switch 134.

In some embodiments, the processing unit 140 would turn off the discharging switch 133 when turning on the charging switch 134. In addition, the processing unit 140 would turn off the charging switch 134 when turning on the discharging switch 133.

In some implementations, the energy storage unit 131 may be realized by super capacitor(s) having very short charging time and good operating performance under low temperature, but the present invention is not limited thereto. The energy storage unit 131 could be any component suitable for storing and releasing energy. The heating unit 132 may be a liquid cooling and heating module that cools the battery unit 110 by using liquid (e.g., water, oil, etc.) and also heats the battery unit 110 by heating the liquid. However, the present invention is not limited thereto. The heating unit 132 may also be a gas heating module, an electrothermal film heating module or any other suitable heating module. Furthermore, the discharging switch 133, the charging switch 134 and the charging switch 150 may be realized by FETs.

In an embodiment of the charging method, after performing step S206, the processing unit 140 can obtain the current capacity C1 of the battery unit 110 again, so as to determine whether the current capacity C1 is greater than a minimum capacitance (step S207). In some implementations, when the minimum capacitance is represented in a relative state-of-charge, the minimum capacitance may be 0%. However, the present invention is not limited thereto. The minimum capacitance could be set according to the setting of each manufacturer.

When the determination result of the processing unit 140 in step S207 is that the current capacity C1 is greater than the minimum capacitance, the processing unit 140 can return to step S202, so as to obtain an updated battery temperature T1 and continue the subsequent steps. When the determination result of the processing unit 140 in step S207 is that the current capacity C1 is lower than or equal to the minimum capacitance, the processing unit 140 could enable the battery unit 110 to enter a shutdown mode (step S208). Herein, the shutdown mode refers to turning off the charge and discharge function of the battery unit 110.

In an embodiment of the charging method, when the determination result of the processing unit 140 in step S205 is that the current capacity C1 is greater than or equal to the preset capacity, the processing unit 140 can further determine whether a discharging current I2 of the battery unit 110 is greater than a preset discharging current (step S209), so as to know the load condition of the battery device 100. In some implementations, the preset discharging current could be 0.5 C.

In an embodiment of step S209, the battery device 100 can further include a battery negative terminal BATT– and a current sensing unit 160. The battery negative terminal BATT– is configured to connect with a corresponding pin of the power receiving device. The current sensing unit 160 is coupled between a negative terminal of the battery unit 110 and the battery negative terminal BATT–, and the current sensing unit 160 is configured to sense the discharging current I2 output by the battery unit 110 via the battery negative terminal BATT–. In some implementations, the current sensing unit 160 may be a sensing resistor, and the processing unit 140 could obtain the magnitude of the discharging current I2 by measuring the voltage on the sensing resistor, but the present invention is not limited thereto, the current sensing unit 160 could be realized by any suitable current sensing meter.

When the determination result of the processing unit 140 in step S209 is that the discharging current I2 is lower than or equal to the preset discharging current, it indicates that the battery unit 110 is under a light load and has enough power (because the determination result in step S205 is that the current capacity is larger than the preset capacity), and the processing unit 140 can thereby set the first value which has been predetermined as the full charge capacity of the battery unit 110 (i.e., perform step S204).

When the determination result of the processing unit 140 in step S209 is that the discharging current I2 is greater than the preset discharging current, it indicates that the battery unit 110 is under heavy load, the processing unit would set a second value which is greater than the first value as the full charge capacity of the battery unit 110 (step S210), so as to compensate for the capacity loss of the battery unit 110. In some implementations, when the second value is represented in a relative state-of-charge, the second value may be, for example, 110%.

In an embodiment of the charging method, the processing unit 140 can obtain an updated battery temperature T1 of the battery unit 110 after performing step S210, so as to determine whether the updated battery temperature T1 is greater than a second preset temperature (step S211). Wherein, the second preset temperature is greater than the first preset temperature. In some implementations, the second preset temperature can substantially be 10 degrees Celsius.

When the determination result of the processing unit 140 in step S211 is that the updated battery temperature T1 is greater than the second preset temperature, the processing unit 140 can perform step S204 to change to set the first value as the full charge capacity of the battery unit 110.

When the determination result of the processing unit 140 in step S211 is that the updated battery temperature T1 is lower than or equal to the second preset temperature, the processing unit 140 would return to step S205, so as to re-confirm the current capacity C1 of the battery unit 110.

As described above, the embodiments of the present invention provide a battery device and a charging method, which raise a battery temperature using a heating system when the battery temperature is lower than a first temperature and the current capacity is lower than a preset capacity, thereby improving the charging performance of a battery unit which is in a low temperature state. Furthermore, when the battery temperature is lower than the first preset temperature and the battery unit is under heavy load, the embodiments of the battery device and the charging method of the present invention further compensate for the capacity loss of the battery unit by increasing the full charge capacity of the battery unit.

The features of the embodiments described above make persons having ordinary skill in the art can clearly appreciate the form of the present specification. Persons having ordinary skill in the art can appreciate that the objectives and/or the advantages of the above embodiments can be accomplished in consistent with the above embodiments by designing or modifying other processes and structures based on the content of the present disclosure. Persons having ordinary skill in the art can also appreciate that the equivalent constructions without departing from the scope and spirit of the present invention can be modified, substituted or retouched without departing from the scope and spirit of the present invention.

What is claimed is:

1. A charging method, comprising:
charging a battery unit with a charging current;
obtaining a battery temperature of the battery unit;
determining whether the battery temperature is lower than a first preset temperature;
determining whether a current capacity of the battery unit is lower than a preset capacity when the battery temperature is lower than the first preset temperature;
enabling a heating system to raise the battery temperature when the current capacity of the battery unit is lower than the preset capacity;
determining whether a discharging current of the battery unit is greater than a preset discharging current when the current capacity is greater than or equal to the preset capacity;
using a first value as a full charge capacity of the battery unit when the discharging current is lower than or equal to the preset discharging current; and
using a second value as the full charge capacity of the battery unit when the discharging current is greater than the preset discharging current, wherein the second value is greater than the first value.

2. The charging method as claimed in claim 1, wherein after the step of enabling the heating system, the charging method further comprises:
determining whether the current capacity of the battery unit is greater than a minimum capacity;
returning to the step of obtaining the battery temperature of the battery unit when the current capacity of the battery unit is greater than the minimum capacity; and
enabling the battery unit to enter a shutdown mode when the current capacity of the battery unit is not greater than the minimum capacity.

3. The charging method as claimed in claim 1, further comprising:
using a first value as a full charge capacity of the battery unit when the battery temperature is greater than or equal to the first preset temperature.

4. The charging method as claimed in claim 1, wherein after the step of using the second value as the full charge capacity of the battery unit, the charging method further comprises:
determining whether the battery temperature of the battery unit is greater than a second preset temperature, wherein the second preset temperature is higher than the first preset temperature; and
using the first value as the full charge capacity of the battery unit when the battery temperature of the battery unit is greater than the second preset temperature.

5. A battery device, comprising:
a battery unit;
a temperature sensing unit, configured to sense a battery temperature of the battery unit;
a heating system, configured to heat the battery unit;
a processing unit, configured to charge the battery unit with a charging current, obtain the battery temperature using the temperature sensing unit, and determine whether the battery temperature is lower than a first preset temperature, wherein the processing unit determines whether a current capacity of the battery unit is lower than a preset capacity when the battery temperature is lower than the first preset temperature, and the processing unit enables the heating system to raise the battery temperature when the current capacity of the battery unit is lower than the preset capacity; and a current sensing unit, coupled to the battery unit and configured to sense a discharging current of the battery unit;

wherein the processing unit further determines whether the discharging current is greater than a preset discharging current when the current capacity is greater than or equal to the preset capacity, wherein the processing unit uses a first value as a full charge capacity of the battery unit when the discharging current is lower than or equal to the preset discharging current, and the processing unit uses a second value as the full charge capacity of the battery unit, wherein the second value is greater than the first value.

6. The battery device as claimed in claim 5, wherein the heating system comprises:

an energy storage unit, configured to store energy;

a heating unit, configured to heat the battery unit; and a discharging switch, coupled between the energy storage unit and the heating unit, wherein the discharging switch conducts an electrical connection between the energy storage unit and the heating unit when the processing unit enables the heating system, whereby the heating unit heats the battery unit based on the energy of the energy storage unit.

7. The battery device as claimed in claim 5, wherein the processing unit further determines whether the current capacity is larger than a minimum capacity after enabling the heating system, wherein the processing unit obtains an updated battery temperature using the temperature sensing unit when the current capacity is greater than the minimum capacity, and the processing unit enables the battery unit to enter a shutdown mode when the current capacity is not greater than the minimum capacity.

8. The battery device as claimed in claim 5, wherein after using the second value as the full charge capacity of the battery unit, the processing unit further obtains an updated battery temperature using the temperature sensing unit and determines whether the updated battery temperature is greater than a second preset temperature, wherein the second preset temperature is higher than the first preset temperature, and the processing unit uses the first value as the full charge capacity of the battery unit when the updated battery temperature is greater than the second preset temperature.

* * * * *